J. A. AMBLER.
Tree for Boots and Shoes.
No. 224,506. Patented Feb. 17, 1880.
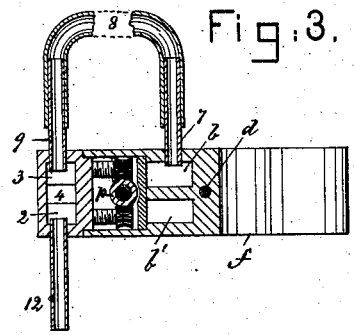
Fig. 3.
Fig. 1.
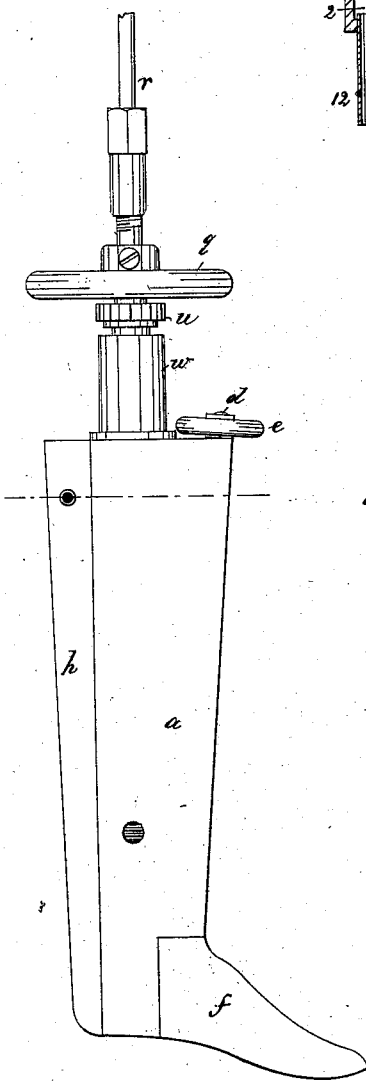
Fig. 2.
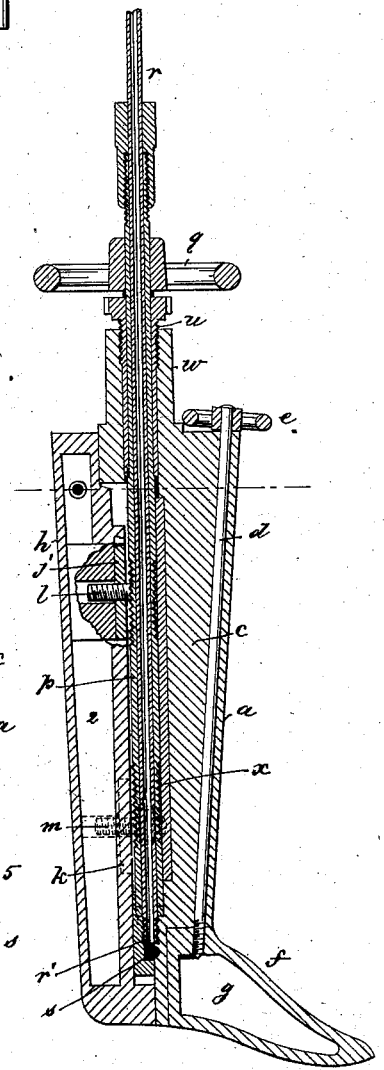
Fig. 4. Fig. 5.
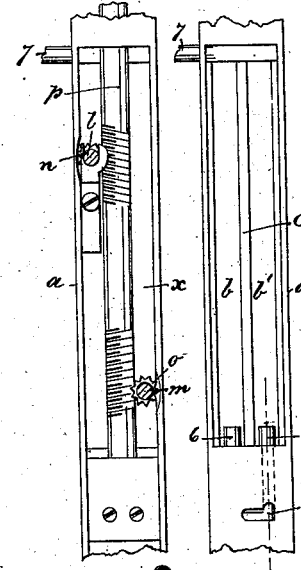
Fig. 6.
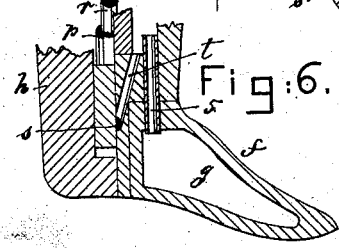
Witnesses.
L. F. Connor.
Jos. P. Livermore.
Inventor.
James A. Ambler,
by Crosby & Gregory, Attys.

UNITED STATES PATENT OFFICE.

JAMES A. AMBLER, OF NATICK, MASSACHUSETTS.

TREE FOR BOOTS AND SHOES.

SPECIFICATION forming part of Letters Patent No. 224,506, dated February 17, 1880.

Application filed December 31, 1879.

*To all whom it may concern:*

Be it known that I, JAMES A. AMBLER, of Natick, county of Middlesex, State of Massachusetts, have invented an Improvement in Trees for Boots and Shoes, of which the following description, in connection with the accompanying drawings, is a specification.

This invention relates to improvements in trees upon which to finish, treat, and shape boots and shoes; and my invention consists, essentially, in a hollow metallic tree adapted to be heated by steam or other heating medium, such as hot liquid or hot air.

One part of this my improved tree is supported with relation to its other part so that it may be moved mechanically to expand or enlarge the size of the tree without permitting the steam to escape therefrom.

The front and back of the tree and the foot part are each composed of hollow metal shells.

Figure 1 represents, in side elevation, a tree embodying my invention; Fig. 2, a longitudinal section thereof as it will preferably be made. Fig. 3 is a section on the dotted line, Fig. 1; Fig. 4, a detail showing a part of the tree-expanding mechanism; Fig. 5, a detail looking into the interior of that part of the shell constituting the front of the tree, the cover-plate $x$ (shown in Fig. 4) being omitted; and Fig. 6, a section through a different portion of the foot and front of the tree from that shown in Fig. 2.

The front $a$ of the tree, shaped substantially as shown, or to correspond in shape with the boot or shoe to be stretched, treated, or treed, is supposed to be made of a metallic shell, made hollow to form spaces $b$ $b'$, to receive steam, by which to heat the front piece of the tree. The two chambers $b$ $b'$ are separated by the web or plate $c$. The foot-fastening device, made as a screw-rod, $d$, having a hand-wheel, $e$, is extended through this web $c$ longitudinally, and screwed into the shank of the metallic shell-like or hollow foot $f$, (see Fig. 2,) having a steam-chamber, $g$. The back piece, $h$, of the tree is made as a metal shell, having steam-chambers 2 3, divided by a web, 4. The back $h$ contains two threaded nuts, $j$ $k$, which receive the screws $l$ $m$, having fixed upon them worm-pinions $n$ $o$, engaged by right and left handed worms on a hollow screw-shaft, $p$, having an attached hand-wheel. This shaft, worm-pinions, screws, and nuts constitute the devices for expanding the tree mechanically, or contracting it, as the screw-shaft $p$ is turned in one or the other direction; but instead of said devices I may employ any others, such as a system of wedges operated by the screw, to force the back part of the tree out away from the front part, $a$. Through the said hollow shaft is extended the steam-pipe $r$, connected in any suitable or proper manner with a steam-generator of usual construction. (Not herein shown.) The inner end of said pipe $r$ terminates at $r'$, and delivers its steam into a port, $s$, (see Figs. 2, 5, and 6,) from which port, along passage $t$, the steam enters chamber $b'$, which it fills, and, heating that part of the front of the tree, passes through pipe 5 into the chamber $g$ of the foot; thence out from said chamber $g$, through pipe 6, (see Fig. 5,) into the chamber through an outlet-pipe, 7, suitably connected at 8 with an inlet-pipe, 9, entered into the chamber 3; thence along said chamber to its other end, through a suitable opening in the said web 4, along the chamber 2, out through the exhaust 12.

In this way the front, back, and foot of the tree may be heated to any desired degree to dry and finish the boot or shoe, and hold it more or less stretched while it is being rubbed in any usual manner.

The shaft $p$ is held in a sleeve, $u$, having a screw-threaded exterior, which is made to engage a screw-thread tapped or cut into the part $w$ of the tree.

The plate $x$ covers the chambers $b$ $b^4$ and sustains the screw-shaft. The said plate is herein shown as made separable from the tree; but in practice it will preferably be cast as part of the front $a$.

A heated tree of the kind shown enables the leather to be kept more or less warm, as desired, to thereby start the oil in it, and by means of the said heat the dressing material applied to the boot may be quickly dried, thus enabling the boot to be finished quickly and by one treeing operation, instead of several, as now commonly practiced.

The shells, instead of being of metal, may be of glass or other suitable material.

I claim—

1. A boot-tree having a hollow shell-like front and foot, combined and connected substantially as described, and provided with passages adapted to admit steam into the said front and foot to heat the said parts, all substantially as set forth.

2. In a tree, a hollow front part and foot, combined with a separate and independent hollow back part, and with pipes and ports for the passage into the said parts of steam, and its exit therefrom, substantially as described.

3. The independent hollow front and back parts having chambers for the reception of steam, combined with a shaft and connecting mechanism, substantially as described, to move the back part with relation to the front part, to increase or lessen the size of the tree without disturbing the steam-connections.

4. The screw-shaft $p$, screws $m\,n$, and worm-pinions and nuts $j\,k$, combined with the front and back of the tree, substantially as described.

5. The hollow front part provided with chambers $b\,b'$, combined with the foot $f$ and communicating pipes or passages 5 6, substantially as described.

6. The hollow foot $f$, combined with the steam-pipe $r$, to lead steam into its passage $g$, substantially as described.

In testimony whereof I have signed my name to this specification in the presence of two subscribing witnesses.

JAMES A. AMBLER.

Witnesses:
L. F. CONNOR,
N. E. C. WHITNEY.